US008967855B1

(12) United States Patent
Joshi et al.

(10) Patent No.: US 8,967,855 B1
(45) Date of Patent: Mar. 3, 2015

(54) ELECTRONIC DEVICE FOR DETERMINING EXTERNAL TEMPERATURE

(71) Applicant: Leeo, Inc., Palo Alto, CA (US)

(72) Inventors: Nina S. Joshi, Saratoga, CA (US); Aaron H. Squier, Santa Monica, CA (US); Andrew G. Stevens, Palo Alto, CA (US)

(73) Assignee: Leeo, Inc., Palo Alto, CA (US)

( * ) Notice: Subject to any disclaimer, the term of this patent is extended or adjusted under 35 U.S.C. 154(b) by 0 days.

(21) Appl. No.: 14/467,872

(22) Filed: Aug. 25, 2014

Related U.S. Application Data

(63) Continuation of application No. PCT/US2014/051949, filed on Aug. 20, 2014.

(51) Int. Cl.
*G01K 7/00* (2006.01)
*G01K 7/02* (2006.01)
*H02J 7/02* (2006.01)

(52) U.S. Cl.
CPC .............. *G01K 7/021* (2013.01); *H02J 7/025* (2013.01)
USPC ............ 374/112; 374/163; 374/100; 374/141

(58) Field of Classification Search
USPC .......................................... 374/141, 208, 163
See application file for complete search history.

(56) References Cited

U.S. PATENT DOCUMENTS

| | | | |
|---|---|---|---|
| 3,030,806 A | | 4/1962 | Davis |
| 5,492,482 A | * | 2/1996 | Lockman et al. ............. 439/329 |
| 6,074,089 A | * | 6/2000 | Hollander et al. ............ 374/181 |
| 6,257,758 B1 | | 7/2001 | Culbertson |
| 7,166,796 B2 | | 1/2007 | Nicolaou |
| 2002/0037026 A1 | | 3/2002 | Sato et al. |
| 2012/0082180 A1 | * | 4/2012 | Edwardson et al. ............ 374/57 |
| 2014/0185646 A1 | | 7/2014 | Mowry et al. |
| 2014/0233186 A1 | * | 8/2014 | Savelli et al. ................. 361/699 |

FOREIGN PATENT DOCUMENTS

WO WO 01/33178 5/2001

OTHER PUBLICATIONS

Moffat. Notes on Using Thermocouples. Jan. 1997 [retrieved Nov. 6, 2014J. Retrieved from the Internet: <URL: http://www.electronics-cooling.com/1997/01/notes-on-using-thermocouples/. pp. 1-9.
Yildiz. Potential Ambient Energy-Harvesting Sources and Techniques. The Journal of Technology Studies, vol. 35, No. 1, Fall 2009 [retrieved Nov. 9, 2014]. Retrieved from the Internet: <URL: http://scholar.lib.vt.edu/ejournals/JOTS/v35lv35n1/yildiz.html>. pp. 1-14.

* cited by examiner

*Primary Examiner* — Mirellys Jagan
(74) *Attorney, Agent, or Firm* — Levine Bagade Han LLP

(57) ABSTRACT

An electronic device that determines an external temperature is described. During operation, the electronic device uses a sensor mechanism (such as an integrated temperature sensor) to determine an internal temperature of the electronic device. Then, a thermoelectric device (which may be based on the Peltier effect and/or the Seeback effect) determines the relative temperature difference between the internal temperature and the external temperature. Next, the external temperature may be determined based on the internal temperature and the temperature difference. For example, the external temperature may be determined relative to a threshold value. Furthermore, an electrical signal (such as a voltage or a current) output by the thermoelectric device may be used to recharge a battery and, more generally, a power source in the electronic device.

20 Claims, 6 Drawing Sheets

ELECTRONIC DEVICE FOR DETERMINING EXTERNAL TEMPERATURE

CROSS-REFERENCE TO RELATED APPLICATION

The present application is a continuation of international Application No. PCT/US14/51949, filed Aug. 20, 2014, which is incorporated by reference herein in its entirety.

BACKGROUND

1. Field

The described embodiments relate generally to an electronic device for determining an external temperature. More specifically, the described embodiments relate to techniques for determining an external temperature using an electronic device with an integrated temperature sensor.

2. Related Art

Trends in connectivity and in portable electronic devices are resulting in dramatic changes in people's lives. For example, the Internet now allows individuals access to vast amounts of information, as well as the ability to identify and interact with individuals, organizations and companies around the world. This has resulted in a significant increase in online financial transactions (which are sometimes referred to as 'ecommerce'). Similarly, the increasingly powerful computing and communication capabilities of portable electronic device (such as smartphones and tablets), as well as a large and growing set of applications, are accelerating these changes, providing individuals access to information at arbitrary locations and the ability to leverage this information to perform a wide variety of tasks.

Recently, it has been proposed these capabilities be included in other electronic devices that are located throughout our environments, including those that people interact with infrequently. In the so-called 'Internet of things,' it has been proposed that future versions of these so-called 'background' electronic devices be outfitted with more powerful computing capabilities and networking subsystems to facilitate wired or wireless communication. For example, the background electronic devices may include: a cellular network interface (LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface (such as a near-field-communication interface). These capabilities may allow the background electronic devices to be integrated into information networks, thereby further transforming people's lives.

However, the overwhelming majority of the existing, background electronic devices in people's homes, offices and vehicles have neither enhanced computing capabilities (such as processor that can execute a wide variety of applications) nor networking subsystems. Given the economics of many market segments (such as the consumer market segment), these so-called 'legacy' background electronic devices (which are sometimes referred to as 'legacy electronic devices') are unlikely to be rapidly replaced.

These barriers to entry and change are obstacles to widely implementing the Internet of things. For example, in the absence of enhanced computing capabilities and/or networking subsystems it may be difficult to communicate with the legacy electronic devices. Furthermore, even when electronic devices include enhanced computing capabilities and/or networking subsystems, power consumption and battery life may limit the applications and tasks that can be performed.

SUMMARY

The described embodiments relate to an electronic device that includes a housing having an inner surface and an outer surface, where the inner surface is thermally coupled to the outer surface, which has an external temperature. Moreover, the electronic device includes an integrated circuit, thermally coupled to the inner surface, with a sensor mechanism that measures a parameter associated with an internal temperature of the integrated circuit. Furthermore, the electronic device includes a thermoelectric device having a first end and a second end, where the first end is thermally coupled to the inner surface and the second end is thermally coupled to the integrated circuit, and the thermoelectric device is electrically coupled to the integrated circuit. The thermoelectric device may output an electrical signal corresponding to a temperature difference between the external temperature and the internal temperature, and the integrated circuit may determine the external temperature based on the electrical signal and the measured parameter.

For example, the sensor mechanism may include a temperature sensor (such as a temperature sensor that is integrated in the integrated circuit) and the parameter may include temperature. However, the sensor mechanism may be other than a temperature sensor and the parameter may be a function of temperature.

Additionally, the electronic device may include a heat pipe thermally coupled to the inner surface and the integrated, circuit.

Note that the external temperature may be determined relative to a threshold value.

In some embodiments, the electronic device includes a measurement device, electrically coupled to the thermoelectric device and the integrated circuit, which measures the electrical signal.

Moreover, the thermoelectric device may be based on a Peltier effect and the electrical signal may include a current. Alternatively or additionally, the thermoelectric device may be based on a Seeback effect and the electrical signal may include a voltage. Furthermore, the electronic device may include a power supply, electrically coupled to the thermoelectric device, which stores power associated with the electrical signal. This power supply may include a recharging circuit and a rechargeable battery, where the recharging circuit may recharge the rechargeable battery based on the electrical signal.

In some embodiments, the housing is inserted in soil or the ground. Alternatively or additionally, the housing may absorb electromagnetic radiation.

Another embodiment provides the integrated circuit that includes: the sensor mechanism; one or more input nodes that electrically couple to the thermoelectric device and that receive the electrical signal; the measurement circuit electrically coupled to the one or more input nodes; and an analysis circuit, electrically coupled to the sensor mechanism and the measurement circuit, which determines the external temperature based on the electrical signal and the measured parameter.

Another embodiment provides a method for determining the external temperature. During operation, the electronic device uses the sensor mechanism in the integrated circuit in the electronic device, to measure the parameter associated with the internal temperature of the integrated circuit. Then, the electronic device receives the electrical signal from the thermoelectric device in the electronic device, where the electrical signal corresponds to the temperature difference between the external temperature in the environment that includes the electronic device and the internal temperature. Next, the electronic device determines the external temperature based on the electrical signal and the measured parameter.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
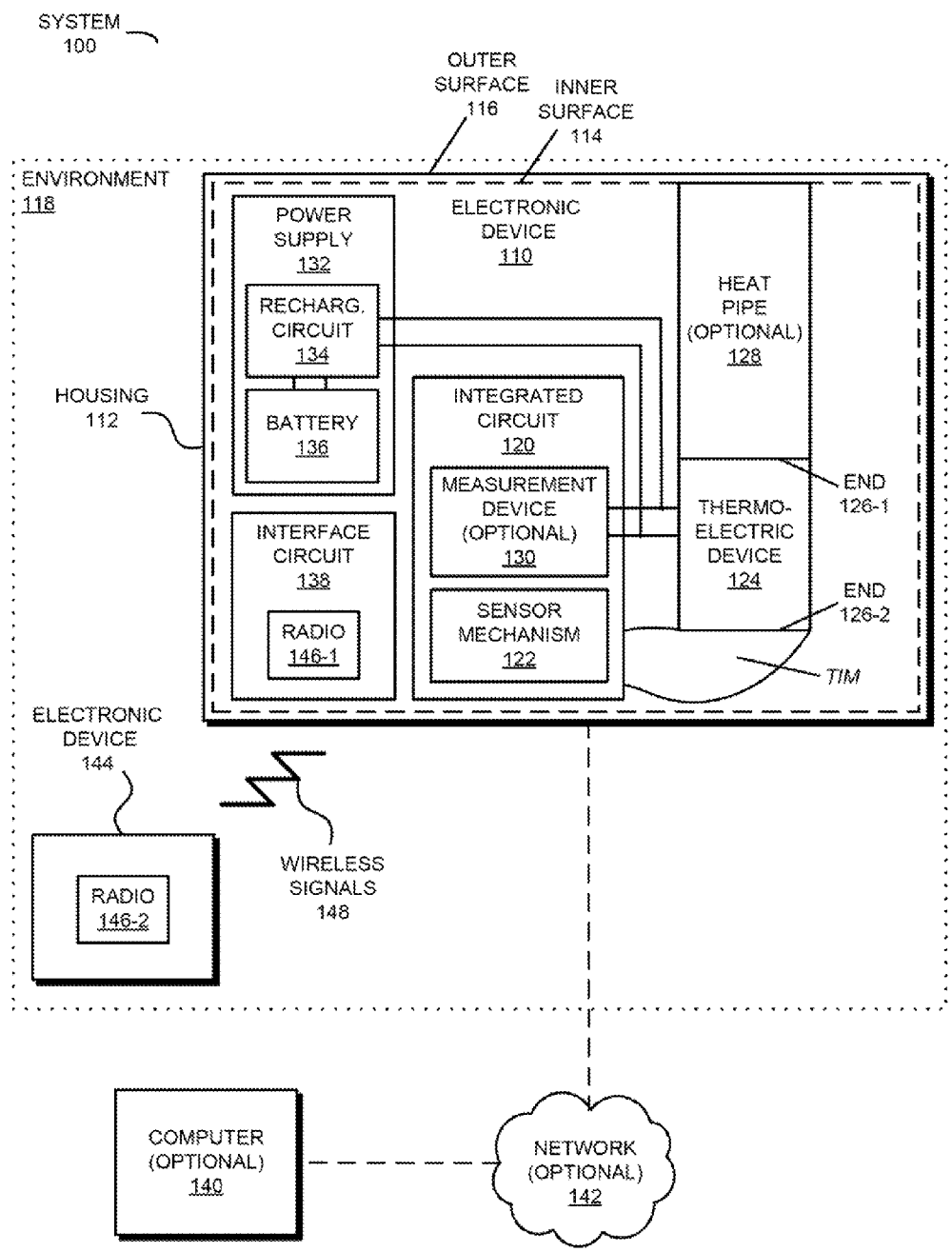
FIG. 1 is a block diagram illustrating a system in accordance with an embodiment of the present disclosure.

An electronic device that determines an external temperature is described. This electronic device uses a sensor mechanism (such as an integrated temperature sensor) to determine an internal temperature of the electronic device. Then, a thermoelectric device (which may be based on the Peltier effect and/or the Seeback effect) determines the relative temperature difference between the internal temperature and the external temperature. Next, the external temperature may be determined based on the internal temperature and the temperature difference. For example, the external temperature may be determined relative to a threshold value. Furthermore, an electrical signal (such as a voltage or a current) output by the thermoelectric device may be used to recharge a battery and, more generally, a power source in the electronic device.

In this way, the electronic device may use an integrated sensor mechanism in conjunction with a thermoelectric device to determine the external temperature. In addition, a temperature gradient between the internal temperature and the external temperature may be used to at least partially power the electronic device. Thus, the electronic device may provide a compact and low-cost way to monitor an environmental condition in an external environment that includes the electronic device, and may have improved operating life (e.g., increased battery life between recharging or replacement of a battery). The resulting improved functionality and services offered by the electronic device may promote sales of the electronic device (and, more generally, commercial activity) and may enhance customer satisfaction with the electronic device.

Note that this environmental-monitoring technique is not an abstract idea. In particular, the determination of the external temperature included in embodiments of the environmental-monitoring technique is not: a fundamental economic principle, a human activity (the operations in the environmental-monitoring technique typically involve measurements in noisy environments), and/or a mathematical relationship/formula. Moreover, the environmental-monitoring technique amounts to significantly more than an alleged abstract idea. In particular, the environmental-monitoring technique may improve the functioning of the electronic device that executes software and/or implements the environmental-monitoring technique. For example, the environmental-monitoring technique may: speed up computations performed during the environmental-monitoring technique; reduce memory consumption when performing the computations; improve reliability of the computations (as evidenced by improved determination of the external temperature); improve the user-friendliness of a user interface that displays results of the measurements (e.g., by allowing a user to view information about environmental condition in the external environment of the electronic device); and/or improve other performance metrics related to the function of the electronic device.

We now describe embodiments of the electronic device. FIG. 1 presents a block diagram illustrating an electronic device 110 in a system 100. This electronic device may include a housing 112 having an inner surface 114 and an outer surface 116, where inner surface 114 is thermally coupled to outer surface 116, which has an external temperature ($T_{ext}$) approximating or equal to that of an external environment 118 that includes electronic device 110. Moreover, electronic device 110 may include an integrated circuit 120, thermally coupled to inner surface 114, with a sensor mechanism 122 (which is illustrated as integrated in integrated circuit 120, although in other embodiments it may be a discrete component). Furthermore, electronic device 110 may include a thermoelectric device 124 having ends 126, where end 126-1 is thermally coupled to inner surface 114 and end 126-2 is thermally coupled to integrated circuit 120 (e.g., by a thermal interface material or TIM, such as solder or grease), and thermoelectric device 124 is electrically coupled to integrated circuit 120.

Figure 3:
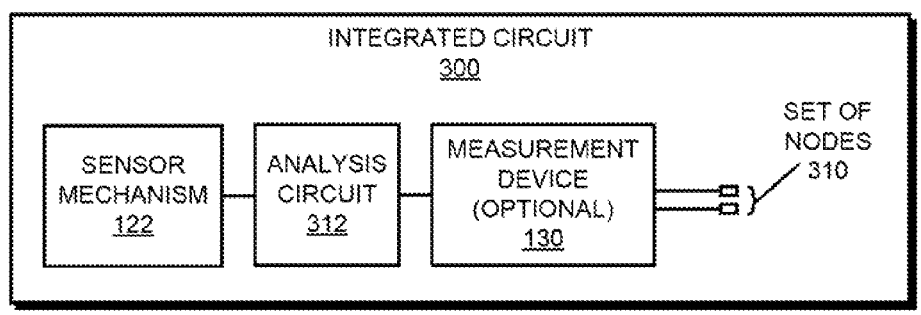
FIG. 3 is a block diagram of an integrated circuit in the electronic device of FIGS. 1 and 2 in accordance with an embodiment of the present disclosure.

As described further below with reference to FIG. 3, during operation sensor mechanism 122 may measure a parameter associated with an internal temperature ($T_{int}$) of integrated circuit 120 and/or electronic device 110. For example, sensor mechanism 122 may include a temperature sensor (such as thermometer, a calibrated resistor, a silicon-bandgap temperature sensor, a metal-oxide-semiconductor field-effect transistor, a thermistor, a thermocouple, a thermopile, a temperature sensor based on an electrothermal filter, etc.) and the parameter may include temperature. However, sensor mechanism 122 may be other than a temperature sensor and the parameter may be a function of temperature (i.e., the temperature may be indirectly determined). In particular, sensor mechanism 122 may include: a calorimeter, a sensor that measures a physical phenomenon that is a function of temperature (such as thermal expansion), a chemical sensor that monitors a temperature-dependent chemical reaction (such as adhesion or a gas or a compound that reacts with the material), a circuit that measures a temperature-dependent frequency and/or phase of a signal, etc.

Moreover, thermoelectric device 124 may output an electrical signal corresponding to a temperature difference ($\Delta T$) between the external temperature and the internal temperature. For example, thermoelectric device 124 may include a thermocouple, a thermopile and/or a thermoelectric generator. Thus, thermoelectric device 124 may be a solid-state thermoelectric device based on the Peltier effect and the electrical signal may include a current. Alternatively or additionally, thermoelectric device 124 may be based on the Seeback effect and the electrical signal may include a voltage. Note that the temperature difference may be positive, zero or negative (i.e., the internal temperature may be less than equal to or greater than the external temperature).

Then, integrated circuit 120 may determine the external temperature (and, more generally, an environmental condition of external environment 118 that includes electronic device 110) based on the electrical signal and the measured parameter. In particular, integrated circuit 120 may analyze electrical signals output by sensor mechanism 122 and thermoelectric device 124. This analysis may include filtering (such as with a low-pass filter or a band-pass filter) that removes noise from the electrical signals and, more generally, spectral shaping. In addition, the analysis may include measurements and/or detection using: a voltmeter, an ammeter, a phase detector, a resonance monitor, a Fourier analyzer, a spectrum analyzer, a lock-in amplifier (which may be synchronized to a time varying electrical signal having a fundamental frequency that corresponds to temperature variations in external environment 118), an averaging circuit (that averages multiple measurements of an electrical signal), a heterodyne receiver (and more generally, a demodulator), and/or another measurement device that measures or captures one or more instances of an electrical signal. Thus, the analysis performed by integrated circuit 120 may include synchronous or asynchronous detection. In some embodiments, determining the external temperature is based on predefined information. In particular, the predefined information (such as a conversion from the parameter to the internal temperature) may be obtained locally (on electronic device 110) using a stored look-up or conversion table. Alternatively or additionally, an interface circuit 138 (or a network interface) in electronic device 110 may access the predefined information remotely, such as from optional computer 140 via optional network 142 (such as the Internet, a wireless local area network, an Ethernet network, an intra-net, an optical network, etc.).

In some embodiments, the analysis includes converting the measured parameter into the internal temperature using a look-up or conversion table that summarizes values of the parameter and corresponding internal temperatures. For example, a resistance of sensor mechanism 122 may be converted into the internal temperature. Similarly, the analysis may include optionally converting the electrical signal into the temperature difference using another look-up or conversion table that summarizes values of the electrical signal and corresponding temperature differences. Then, the external temperature may be determined as the sum of the internal temperature and the temperature difference. Note that the external temperature may be determined relative to a threshold value (such as a temperature increase relative to the internal temperature of more than 10 C). Thus, the determined external temperature may be compared to the threshold value, and a binary output may be calculated (e.g., a '0' may be less than the threshold value and a '1' may be greater than the threshold value). Alternatively, the absolute external temperature may be determined with an accuracy (such as 0.1, 1, 2 or 5 C.) over a range of temperatures. In these ways, the environmental condition (which may include the external temperature and/or which may be a function of or depend on the external temperature) in external environment 118 may be determined.

In some embodiments, the electronic device includes an optional heat pipe 128 thermally coupled to inner surface 114 and integrated circuit 120. (More generally, there may be a heat path between inner surface 114 and integrated circuit 120, which may or may not include optional heat pipe 128.) This optional heat pipe may convey heat between inner surface 114 and integrated circuit 120. For example, optional heat pipe 128 may include a liquid and a gas that conduct and/or convect heat in opposite directions in optional heat pipe 128. Furthermore, electronic device 110 may include an optional measurement device 130, electrically coupled to thermoelectric device 124 and integrated circuit 120, which measures the electrical signal. These measurements may be used by integrated, circuit 120 when determining the external temperature.

In addition, electronic device 110 may include a power supply 132, electrically coupled to thermoelectric device 124, which stores power associated with the electrical signal. For example, power supply 132 may include a recharging circuit 134 and a rechargeable battery 136 (and, more generally, a device that includes one or more cells and that converts stored chemical energy into electricity), where recharging circuit 134 may recharge rechargeable battery 136 based on the electrical signal. Thus, the temperature difference may be used to power electronic device 110, thereby improving operating life or a time between recharges of rechargeable battery 136. In some embodiments, recharging circuit 134 includes: a regulated power supply, a DC power supply, an AC power supply, a switched-mode power supply, etc. This may facilitate the recharging by converting the electrical signal from thermoelectric device 124 into a DC or an AC electrical signal that is suitable for recharging rechargeable battery 136.

After determining the external temperature, electronic device 112 may use interface circuit 138 to communicate the determined external temperature with one or more other electronic devices, such as electronic device 144 (which may be another instance of electronic device 110 or a legacy electronic device). For example, electronic device 110 may wirelessly communicate packets with information specifying the determined external temperature to electronic device 144. These packets may be included in frames in one or more wireless channels. Consequently, interface circuit 138 may include a radio 146-1 that transmits wireless signals 148 (illustrated by a jagged line) to electronic device 144, which are received by radio 146-2. In general, the wireless communication between electronic devices 110 and 144 may or may not involve a connection being established among these electronic devices, and therefore may or may not involve communication via a wireless network. Note that the communication between optional computer 140 and electronic device 110 via optional network 142 may involve a different communication protocol than that associated with wireless signals 148. Thus, the communication via optional network 142 may or may not involve wireless signals.

The determined external temperature (and, more generally, the environmental condition, which may correspond to the external temperature) may facilitate a variety of services and improved functionality of the electronic devices in FIG. 1. For example, services may be offered to: users associated with electronic devices 112 and/or 144 (such as owners or renters of these electronic devices), suppliers of components or spare parts, maintenance personnel, security personnel, emergency service personnel, insurance companies, insurance brokers, realtors, leasing agents, apartment renters, hotel guests, hotels, restaurants, businesses, organizations, governments, potential buyers of physical objects, a shipping or transportation company, etc. In particular, the determined external temperature may allow the function or operation of one or more electronic, devices in FIG. 1 (such as a legacy electronic device and/or a regulator device, which may or may not directly communicate information with electronic device 110 and/or 144) to be adapted or changed. In this way, an environmental condition (such as the temperature, humidity, an illumination pattern, etc.) in external environment 118 may be dynamically modified. In addition, the service(s) may include maintenance notifications about electronic devices 110 and/or 144. For example, based on the determined external temperature, electronic device 110 may provide a maintenance notification to a user's cellular telephone via optional network 142) to perform a remedial action (such as a repair or service to be performed on electronic device 144).

More generally, electronic device 110 may be used in a wide variety of applications. In some embodiments, housing 112 is inserted in soil or the ground in external environment 118. For example, electronic device 110 may include or may be coupled to a stake (or another surface mount) that functions as a beat pipe or heat path to convey the temperature difference to thermoelectric device 124. This stake may have more surface area underground to facilitate equilibration with external environment 118. Alternatively or additionally, housing 112 may absorb electromagnetic radiation (e.g., over a range of wavelengths, such as in the visible and/or the infrared spectrum) from a radiating body (such as the sun or a source of blackbody emissions).

Although we describe the environment shown in FIG. 1 as an example, in alternative embodiments, different numbers or types of electronic devices may be present. For example, some embodiments comprise more or fewer electronic devices. Furthermore, while not shown in FIG. 1, one or more components in electronic device 112 may be coupled or connected by additional signals lines or a bus.

Figure 2:
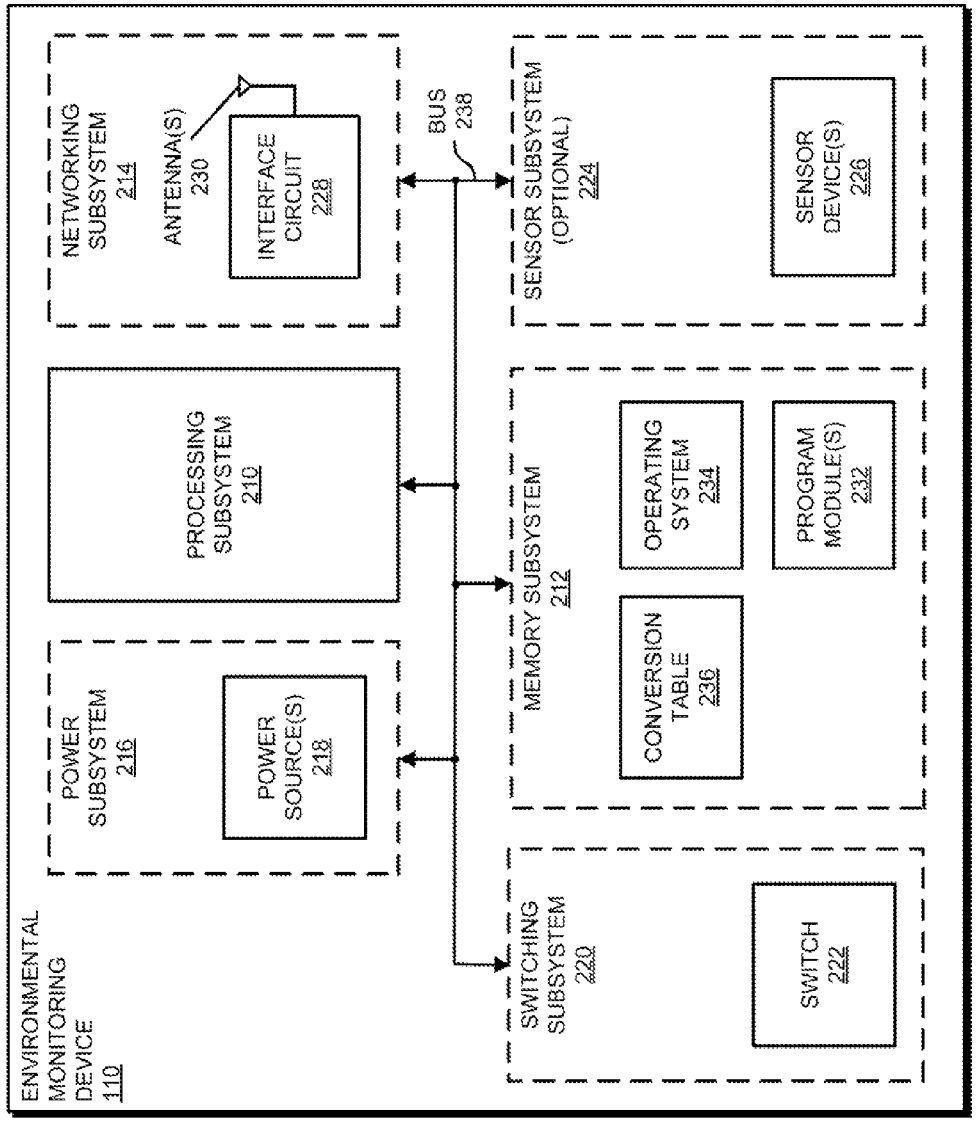
FIG. 2 is a block diagram illustrating an electronic device in the system of FIG. 1 in accordance with an embodiment of the present disclosure.

FIG. 2 presents a block diagram illustrating electronic device 110. This electronic device includes processing subsystem 210 (and, more generally, an integrated circuit or a control mechanism), memory subsystem 212, a networking subsystem 214, power subsystem 216, switching subsystem 220 and optional sensor subsystem 224 (i.e., a data-collection subsystem and, more generally, a sensor mechanism). Processing subsystem 210 includes one or more devices configured to perform computational operations and to execute techniques to process sensor data. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210, networking subsystem 214 and/or optional sensor subsystem 224. For example, memory subsystem 212 can include dynamic random access memory (DRAM), static random access memory (SRAM), and/or other types of memory. Memory subsystem 212 may store one or more conversion tables 236 (such as a table with values of the parameter and the corresponding internal temperature). In some embodiments, instructions for processing subsystem 210 in memory subsystem 212 include: one or more program modules 232 or sets of instructions, which may be executed in an operating environment (such as operating system 234) by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110 as fast-access storage for often-used data, while the mass-storage device is used to store less frequently used data.

Networking subsystem 214 includes one or more devices configured to couple to and communicate on a wired, optical and/or wireless network (i.e., to perform network operations and, more generally, communication), including an interface circuit 228 (such as a ZigBee® communication circuit) and one or more antennas 230. For example, networking subsystem 214 may include: a ZigBee® networking subsystem, a Bluetooth™ networking system (which can include Bluetooth™ Low Energy, BLE or Bluetooth™ LE), a cellular networking system (e.g., a 3G/4G network such as UMTS, LIE, etc.), a USB networking system, a networking system based on the standards described in IEEE 802.11 (e.g., a Wi-Fi® networking, system), an Ethernet networking system, an infra-red communication system, a power-line communication system and/or another communication system (such as a near-field-communication system or an ad-hoc-network networking system).

Moreover, networking subsystem 214 includes processors, controllers, radios/antennas, sockets/plugs, and/or other devices used for coupling to, communicating on, and handling, data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic, device 110 may use the mechanisms in networking, subsystem 214 for performing, simple wireless communication between electronic device 110 and other electronic devices, e.g., transmitting advertising frames, petitions, beacons and/or information associated with near-field communication.

Moreover, electronic device 110 may include power subsystem 216 with one or more power sources 218. Each of these power sources may include: a battery (such as a rechargeable or a non-rechargeable battery), a DC power supply, a transformer, and/or a switched-mode power supply. Moreover, the one or more power sources 218 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid, or may be remateable. Note that the one or more power sources 218 may be mechanically and electrically coupled to an external power source or another electronic device by one of the electrical-connection nodes in switch 222 in switching subsystem 220.

In some embodiments, power subsystem 216 includes or functions as a pass-through power supply for one or more electrical connectors to an external electronic device (such as an appliance or a regulator device) that can be plugged into the one or more electrical connectors, Power to the one or more electrical connectors (and, thus, the external electronic device) may be controlled locally by processing subsystem 210, switching subsystem 220 (such as by switch 222), and/or remotely via networking subsystem 214.

In addition to sensor mechanism 122 and thermoelectric device 124 (FIG. 1), optional sensor subsystem 224 may include one or more sensor devices 226 (or a sensor array), which may include, one or more processors and memory. For example, the one or more sensor devices 226 may include a thermal sensor (such as a thermometer), a humidity sensor, a barometer, a camera or video recorder (such as a CCD or CMOS imaging sensor), one or more microphones (which may be able to record acoustic information, including acoustic information in an audio band of frequencies, in mono or stereo), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a chemical-analysis device, a mass spectrometer, a microanalysis device, a nano-plasmonic sensor, a genetic sensor (such as a microarray), an accelerometer, a position or a location sensor (such as a location sensor based on the Global Positioning System or GPS), a gyroscope, a motion sensor (such as a light-beam sensor), a contact sensor, a strain sensor (such as a strain gauge), a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 226 may include redundancy (such as multiple instances of a type of sensor device) to address sensor failure or erroneous readings, to provide unproved accuracy and/or to provide improved precision.

During operation of electronic device 110, processing subsystem 210 may execute one or more program modules 232, such as an environmental-monitoring application that uses one or more sensor devices 226 to monitor one or more environmental conditions in an external environment that includes electronic device 110, such as the external temperature. The resulting sensor data may be used by the environmental-monitoring application to modify operation of electronic device and/or the external electronic device, and/or to provide information about the external environment to another (separate) electronic device (e.g., via networking subsystem 214).

Moreover, electrical signals provided by thermoelectric device 124 (FIG. 1) may be used to recharge one or more of power sources 218. For example, this power may, at least in part, offset or compensate for power loss (associated with one or more components in electronic device 110) during operation or a standby mode of electronic device 110 (which is sometimes referred to as a parasitic power loss).

After the external temperature has been determined, the environmental-monitoring application may share this information and/or information about an associated environmental condition with one or more other electronic devices via networking subsystem 218.

Within electronic device 110, processing subsystem 210, memory subsystem 212, networking subsystem 214 power subsystem 216, switching subsystem 220 and/or optional sensor subsystem 224 may be coupled using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems.

Electronic device 110 can be (or can be included in) a wide variety of electronic devices. For example, electronic device 110 can be (or can be included in): a sensor (such as a smart sensor), a tablet computer, a smartphone, a cellular telephone, an appliance, a regulator device, a consumer-electronic device (such as a baby monitor), a portable computing device, test equipment, a digital signal processor, a controller, a personal digital assistant, a laser printer (or other office equipment such as a photocopier, a personal organizer, a toy, a set-top box, a computing device (such as a laptop computer, a desktop computer, a server, and/or a subnotebook/netbook), a light (such as a nightlight), an alarm, a smoke detector, a carbon-monoxide detector, a monitoring, device, and/or another electronic device (such as a switch or a router).

Although specific components are used to describe electronic device 110, in alternative embodiments, different components and/or subsystems may be present in electronic device 110. For example, electronic device 110 may include one or more additional processing subsystems, memory subsystems, networking subsystems, power subsystems, switching subsystems, and/or sensor subsystems. Additionally, one or more of the subsystems may not be present in electronic device 110. Moreover, in some embodiments, electronic device 110 may include one or more additional subsystems that are not shown in FIG. 2, such as a user-interface subsystem, a display subsystem, and/or a feedback subsystem (which may include speakers and/or an optical source).

Although separate subsystems are shown in FIG. 2, in some embodiments, some or all of a given subsystem or component can be integrated into one or more of the other subsystems or components in electronic device 110. For example, in some embodiments the one or more program modules 232 are included in operating system 234. In some embodiments, a component in a given subsystem is included in a different subsystem.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some Or all of the functionality of electronic device 110. Moreover, the integrated circuit may include hardware and/or software mechanisms that are used for transmitting wireless signals from electronic device 110 to and receiving signals at electronic device 110 from other electronic devices. Aside from the mechanisms herein described, radios are generally known in the art and hence are not described in detail, in general, networking, subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, a petition, a beacon, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Aspects of the environmental-monitoring technique may be implemented using an integrated circuit. This is shown in FIG. 3, which presents a block diagram of integrated circuit 300 in electronic device 110 (FIGS. 1 and 2). In particular, this integrated circuit may include: sensor mechanism 122; one or more input nodes 310 that electrically couple to thermoelectric device 124 (FIG. 1) and that receive the electrical signal; optional measurement circuit or measurement device 130 electrically coupled to the one or more input nodes 310; and an analysis circuit 312, electrically coupled to sensor mechanism 122 and optional measurement device 130, which determines the external temperature based on the electrical signal and the measured parameter.

In some embodiments, an output of a process for designing integrated circuit 300, or a portion of integrated circuit 300, which includes one or more of the circuits described herein may be a computer-readable medium such as, for example, a magnetic tape or an optical or magnetic disk. The computer-readable medium may be encoded with data structures or other information describing circuitry that may be physically instantiated as integrated circuit 300 or the portion of integrated circuit 300. Although various formats may be used for such encoding, these data structures are commonly written in Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

Figure 4:
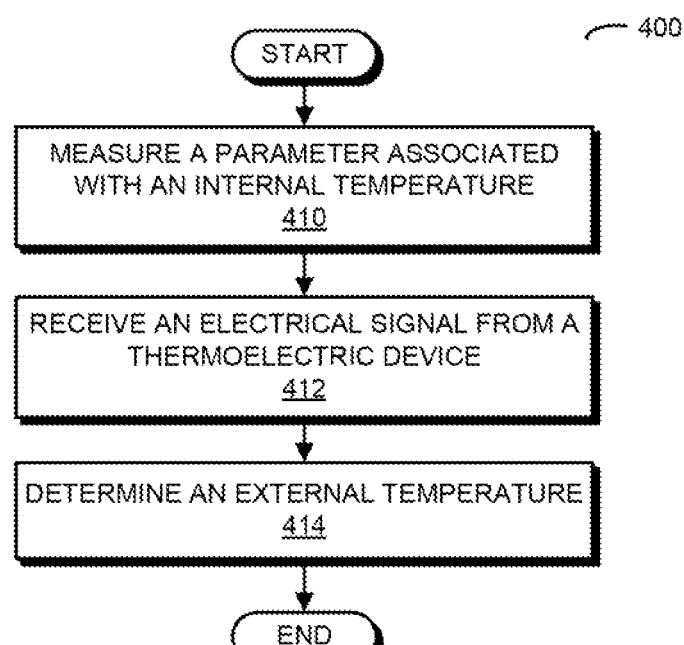
FIG. 4 is a flow diagram illustrating a method for determining an external temperature of the electronic device of FIGS. 1 and 2 in accordance with an embodiment of the present disclosure.

We now further describe the environmental-monitoring technique and operation of the electronic device. FIG. 4 presents a flow diagram illustrating a method 400 for determining the external temperature, which may be performed by electronic device 110 FIGS. 3 and 2). During operation, the electronic device uses the sensor mechanism in the integrated circuit in the electronic device to measure the parameter associated with the internal temperature (operation 410) of the integrated circuit. Then, the electronic device receives the electrical signal from the thermoelectric device (operation 412) in the electronic device, where the electrical signal corresponds to the temperature difference between the external temperature in the environment that includes the electronic device and the internal temperature. Next, the electronic device determines the external temperature (operation 414) based on the electrical signal and the measured parameter.

Figure 5:
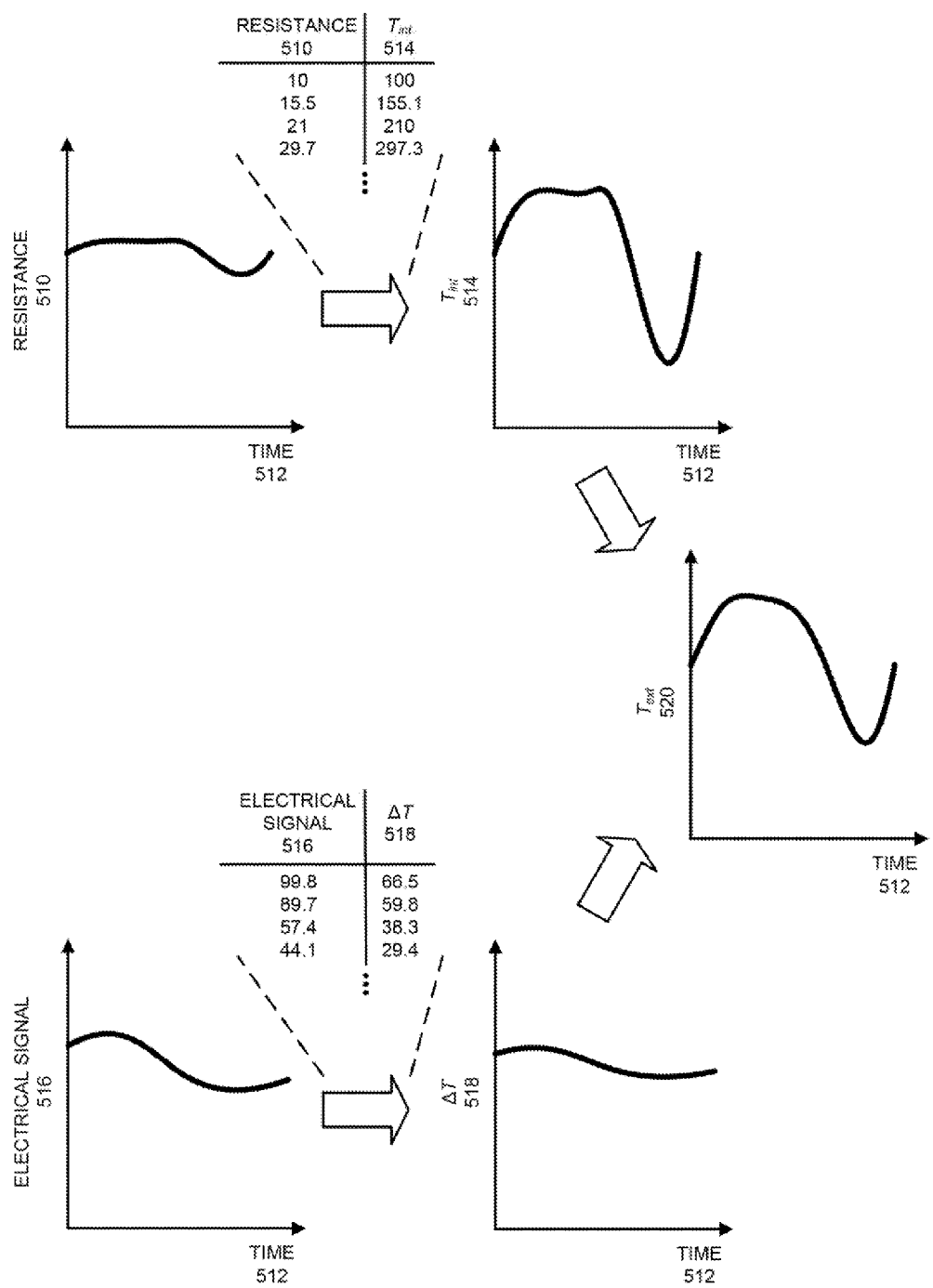
FIG. 5 is a drawing illustrating determination of the external temperature of the electronic device of FIGS. 1 and 2 in accordance with an embodiment of the present disclosure.

In an exemplary embodiment, the sensor mechanism includes a calibrated resistor and the thermoelectric device includes a thermocouple. The resistance of the calibrated resistor is converted into a corresponding internal temperature $T_{int}$ using a look-up or a conversion table, and the voltage across the thermocouple is converted into a corresponding temperature difference $\Delta T$ using another look-up table. The sum of the internal temperature and the temperature difference is the external temperature $T_{ext}$. This is shown in FIG. 5, which presents a drawing illustrating determination of the external temperature of electronic device 110 (FIGS. 1 and 2). In particular, resistance 510 as a function of time 512 is mapped or converted into $T_{int}$ 514. Similarly, electrical signal 516 as a function of time 512 is mapped or convened into $\Delta T$ 518. Then, the sum of $T_{int}$ 514 and $\Delta T$ 518 is $T_{ext}$ 520.

Variations in the external temperature may be associated with an environmental condition (such as operation of a regulator device, e.g., a thermostat). Consequently, the time dependence of the external temperature (or a fundamental frequency of the variation) may be used to infer the environmental condition. In some embodiments, the external temperature is determined relative to a threshold value or based on an accuracy (such as a temperature change of 10 C). For example, the threshold value may be 32 F or 80 F. This may allow the electronic device to indicate when pipes in the external environment may freeze or when chocolate may melt. Based on the external temperature exceeding the threshold value (or being less than the threshold value), a switch in the electronic device may selectively electrically couple or decouple another electronic device (such as the regulator device) from a power source. In this way, a regulator device (such as a fan, an air conditioner, a heater, an air filter, a humidifier, etc.) may be selectively activated. Alternatively or additionally, the threshold value may be related to a medical condition of the user. Note that, while preceding discussion illustrated selective electrical coupling or decoupling based on a static or fixed preference (i.e., the threshold value), more generally, the threshold value may evolve or change as a function of time or the environmental condition, which may allow electronic device 110 (FIGS. 1 and 2) to dynamically respond to or control the environmental condition.

Figure 6:
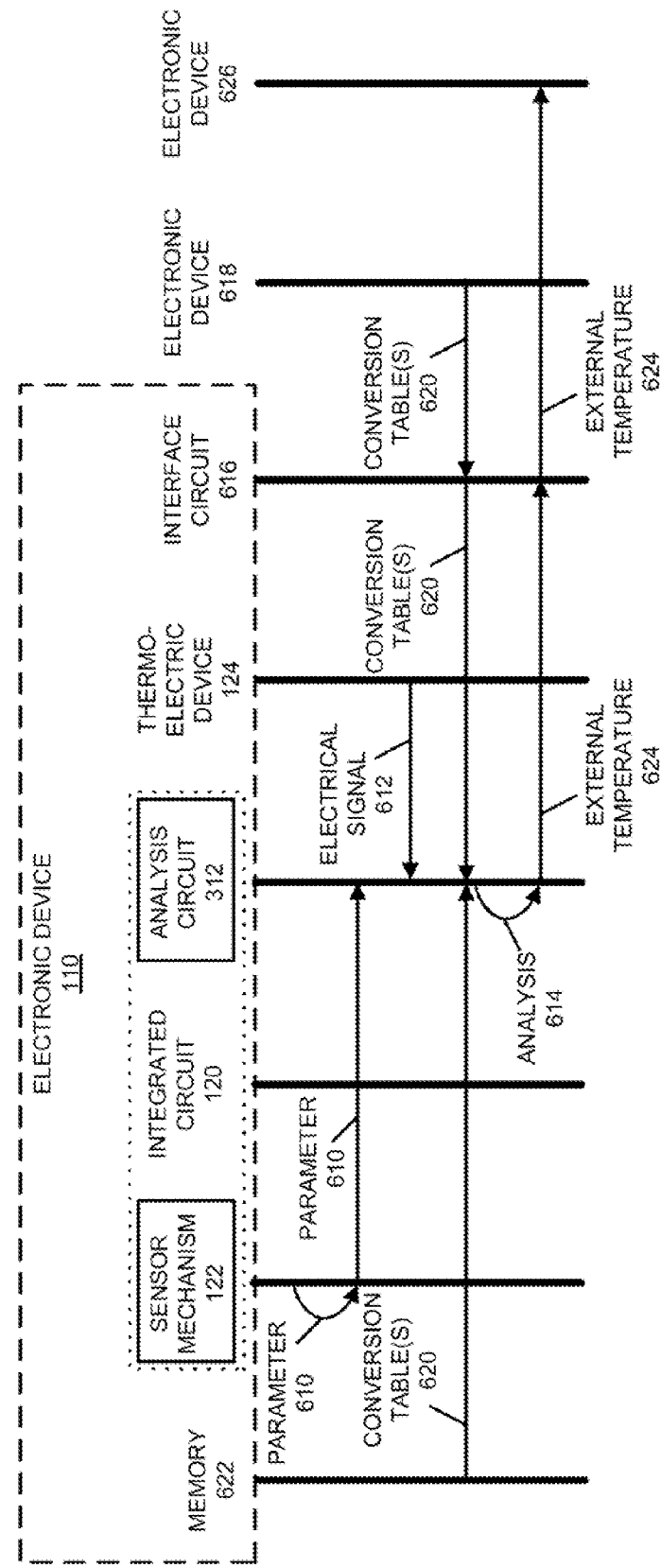
FIG. 6 is a drawing illustrating communication within the electronic device of FIGS. 1 and 2 during the method of FIG. 4 in accordance with an embodiment of the present disclosure.

FIG. 6 presents a drawing illustrating communication within electronic device 110 (FIGS. 1 and 2) during method 400 (FIG. 4). During operation of electronic device 110, sensor mechanism 122 in integrated circuit 120 may measure parameter 610 associated with the internal temperature of integrated circuit 120. Then, parameter 610 may be provided to analysis circuit 312 in integrated circuit 120.

Next, thermoelectric device 124 may provide electrical signal 612 to analysis circuit 312. Analysis circuit 312 may perform analysis 614 on parameter 610 and electrical signal 612 may determine the external temperature. During this analysis, interface circuit 616 may receive one or more conversion tables 620 from electronic device 618. These conversion tables 620 may be used during analysis 614. Alternatively or additionally, integrated circuit 120 may access conversion tables 620 in local memory 622.

Subsequently, integrated circuit 120 may provide the determined external temperature 624 to interface circuit 616, and interface circuit 616 may provide external temperature 624 to electronic device 626 (such as a regulator device, a user's cellular telephone, a computer that maintains a historical log of environmental conditions in an environment that includes electronic device 110, etc.).

While the preceding example illustrated integrated circuit 120 performing operations in the environmental-monitoring technique, in other embodiments at least some of these operations are performed by a processor in electronic device 600 (i.e., at least some of the operations may be performed by software executed by the processor).

In some embodiments of one or more of the preceding methods, there may be additional or fewer operations. For example, the determined external temperature may be mapped or converted into an associated environmental condition in method 400 (FIG. 4) using additional information, such as predefined relationship between the external temperature and the environmental condition. Furthermore, the order of the operations may be changed, and/or two or more operations may be combined into a single operation. In addition, in some of the preceding embodiments there are fewer components, more components, a position of a component is changed and/or two or more components are combined.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a housing having an inner surface and an outer surface, wherein the inner surface is thermally coupled to the outer surface, which has an external temperature; and
an integrated circuit, thermally coupled to the inner surface, including a sensor mechanism configured to measure a parameter associated with an internal temperature of the integrated circuit; and
a thermoelectric device having a first end and a second end, wherein the first end is thermally coupled to the inner surface and the second end is thermally coupled to the integrated circuit, wherein the thermoelectric device is electrically coupled to the integrated circuit, and wherein the thermoelectric device is configured to output an electrical signal corresponding to a temperature difference between the external temperature and the internal temperature; and
wherein the integrated circuit is configured to determine the external temperature based on the electrical signal and the measured parameter.

2. The electronic device of claim 1, further comprising a heat pipe thermally coupled to the inner surface and the integrated circuit.

3. The electronic device of claim 1, wherein the sensor mechanism includes a temperature sensor and the parameter includes temperature.

4. The electronic device of claim 1, wherein the sensor mechanism is other than a temperature sensor and the parameter is a function of temperature.

5. The electronic device of claim 1, wherein the external temperature is determined relative to a threshold value.

6. The electronic device of claim 1, further comprising a measurement device, electrically coupled to the thermoelectric device and the integrated circuit, configured to measure the electrical signal.

7. The electronic device of claim 1, wherein the housing is configured for insertion soil.

8. The electronic device of claim 1, wherein the housing is configured to absorb electromagnetic radiation.

9. The electronic device of claim 1, wherein the thermoelectric device is based on a Peltier effect and the electrical signal includes a current.

10. The electronic device of claim 9, further comprising a power supply, electrically coupled to the thermoelectric device, configured to store power associated with the electrical signal.

11. The electronic device of claim 10, wherein the power supply includes a recharging circuit and a rechargeable battery; and
wherein the recharging circuit is configured to recharge the rechargeable battery based on the electrical signal.

12. The electronic device of claim 1, wherein the thermoelectric device is based on a Seeback effect and the electrical signal includes a voltage.

13. The electronic device of claim 1, further comprising a power supply, electrically coupled to the thermoelectric device, configured to store power associated with the electrical signal.

14. The electronic device of claim 13, wherein the power supply includes a recharging circuit and a rechargeable battery.

15. An integrated circuit, comprising:
a sensor mechanism configured to measure a parameter associated with an internal temperature of the integrated circuit;
one or more input nodes configured to electrically couple to a thermoelectric device and to receive an electrical signal, wherein the electrical signal corresponds to a temperature difference between an external temperature in an environment that includes the integrated circuit and the internal temperature;
a measurement circuit, electrically coupled to the one or more input nodes, configured to measure the electrical signal; and
an analysis circuit, electrically coupled to the sensor mechanism and the measurement circuit, configured to determine the external temperature based on the electrical signal and the measured parameter.

16. The integrated circuit of claim 15, wherein the sensor mechanist includes a temperature sensor and the parameter includes temperature.

17. The integrated circuit of claim 15, wherein the sensor mechanism is other than a temperature sensor and the parameter is a function of temperature.

18. The integrated circuit of claim 15, wherein the external temperature is determined relative to a threshold value.

19. The integrated circuit of claim 15, further comprising:
   a recharging circuit, electrically coupled to the one or more input nodes, configured to convert the electrical signal into a recharging signal; and
   one or more output nodes, electrically coupled to the recharging circuit, configured to electrically couple to a power source.

20. An electronic-device-implemented method for determining an external temperature, wherein the method comprises:
   using a sensor mechanism in an integrated circuit in the electronic device, measuring a parameter associated with an internal temperature of the integrated circuit;
   receiving an electrical signal from a thermoelectric device in the electronic device, wherein the electrical signal corresponds to a temperature difference between an external temperature in an environment that includes the electronic device and the internal temperature; and
   determining the external temperature based on the electrical signal and the measured parameter.

* * * * *